Patented June 18, 1929.

1,717,719

UNITED STATES PATENT OFFICE.

HERBERT E. MARTIN, OF CUMBERLAND, MARYLAND, ASSIGNOR TO CELANESE CORPORATION OF AMERICA, A CORPORATION OF DELAWARE.

PROCESS OF EXTRACTING ACIDS FROM SOLUTIONS.

No Drawing. Application filed December 3, 1927. Serial No. 237,591.

This invention relates to improvements in the manufacture of concentrated lower aliphatic acids from their solutions and particularly their dilute solutions of whatever origin, and particularly to the manufacture of concentrated acetic acid from dilute acetic acid such as crude pyroligneous acid, acetic acid obtained as a waste product in acetylation processes such as the acetylation of cellulose, fermentation acid, etc.

An object of this invention is to provide a process for extracting the acids from relatively dilute solutions of the same by means of an extracting medium, which extracting medium is noninflammable so that the process may be carried on without fire risk.

Another object of this invention is to provide a process for extracting acids from aqueous solutions of the same by the use of such a solvent that the resulting acid is of higher concentration than has heretofore been possible. Other objects of this invention will appear from the following detailed description.

It is known to extract dilute acetic acid as above set forth with the aid of liquids insoluble or relatively insoluble in water such as ether, ethyl acetate, benzol, cresol or other phenols or tar acids of high boiling point, etc. When extracting acetic acid from its aqueous solution with solvents such as ether or ethyl acetate, however, it is found that acetic acid of concentrations only up to about 70% is obtained, due to the fact that the water is soluble to some extent in these solvents. Moreover, since these solvents are quite volatile and highly inflammable, their use entails great fire risk.

It has been found that if a liquid containing certain water insoluble halogen derivatives of hydrocarbons such as methylene chloride $CH_2CL_2$, or its homologues, be employed as an extracting medium for the acid, an economical process results. Furthermore, because of the noninflammable character of methylene chloride, the extraction process wherein it is used may be carried out in the same building where other processes are being employed, whereas where highly inflammable materials such as ethyl ether or petroleum ether are used, the extraction plant must be well isolated from other buildings. Moreover, when methylene chloride or its equivalent is used as the extraction medium, acetic acid of much higher concentration than has heretofore been obtainable by means of solvents alone is produced, for example acetic acid of 92 to 98.6% or even up to 100%.

The extracting liquid need not necessarily consist wholly of methylene chloride or its equivalent but it may contain other volatile solvents for acetic acid. Thus the extracting liquid may also contain ethyl ether. However, in order to obtain the full benefits of the use of methylene chloride, it is preferable to keep the percent of the ether down so that the mixture is relatively noninflammable. It has been found that mixtures containing at least 80% of methylene chloride and not more than 20% ether are sufficiently noninflammable to be used with safety.

Instead of methylene chloride or its homologues, methylene bromide or methylene iodide or their homologues may be used.

The methylene chloride used in the process may be the crude product or the refined product obtained by one or more fractional distillations. The refined product is preferred as more concentrated acetic acid may be obtained with its use but this invention is not limited to this. Thus when the crude methylene chloride is used, a product containing 92% acetic acid is obtained, whereas a product containing 98.6% acetic acid is obtained when there is used a refined methylene chloride, obtained by the fractional distillation of the crude methylene chloride. Moreover, the separation into layers is cleaner and more efficient when the refined methylene chloride is used, and likewise there is a more distinct separation of the acetic acid from the methylene chloride by the fractional distillation. Furthermore, when the crude methylene chloride is used a large proportion of the impurities are retained in the acetic acid.

After extraction of the acetic acid with the solvent, the acetic acid may be recovered from the extraction product by fractional distillation or in any other suitable manner. When methylene chloride is used, the separation by distillation is quite sharp because of the great difference between the boiling points, the boiling point of methylene chloride being 41.6° C. while that of acetic acid is 118° C.

The extraction may be carried out in any known manner. It may be carried out as a batch process wherein the dilute acetic acid and the extraction medium are introduced into a tank, thoroughly mixed and then permitted to separate into layers which are separately drawn off. For further efficiency it is better to carry out the batch extraction in a series of tanks in a methodical manner, i. e. the first tank is fed with fresh extraction medium and dilute acetic acid that has been subjected to a former extraction treatment, while the last tank is fed with fresh dilute acetic acid and the extraction medium that has been used for former extractions and is therefore charged with acetic acid. The intermediate tanks are supplied with the extraction medium and with the dilute acetic acid in such a manner that the extraction medium passes from the first tank progressively to the last tank while the acetic acid flows in opposite direction from the last tank to the first.

Or else, the extraction may be carried out in a column either using the counter-current principle or the concurrent principle. The column may be empty or it may be partially or wholly filled with filling materials such as Raschig rings, broken stone or earthenware, or it may contain baffle plates provided with bubble caps. Since methylne chloride is heavier than acetic acid, it is introduced at the top of the column. Either or both the acid and extracting medium may be introduced into the column through sprays, roses, nozzles or the like. More than one column may be used, in which case they are preferably connected in series in such manner as to permit methodical extraction.

The extracting medium after separation from the aqueous liquid may then be fed to a distilling device, such as a fractionating column which is preferably provided with bubble trays or filling material. It may be lead directly to the still but is preferably passed through heat exchangers wherein it absorbs the heat by indirect heat exchange from the vapors and or residue of the still. The extraction medium is then recovered either from the vapors or the residue and returned to the extraction apparatus.

A further method of carrying out the extraction process consists in introducing the methylene chloride in the form of vapor into the dilute acid still in liquid form. The extraction with vapors may be carried out in a column apparatus, the dilute acid being introduced at the top in the form of a spray and may, if desired, be preheated while the vapors of the methylene chloride are introduced at the bottom. The tower or column is preferably packed with any suitable material so as to obtain good mixing and also may be provided with a heating jacket. In this case again the extraction product may be drawn off directly into the fractionating still, and since the methylene chloride is more volatile than the acetic acid the vapors coming off may be led directly to the extraction column to be utilized for extracting further quantities of dilute acid. Any other suitable extracting apparatus or process may be used.

It has been found that when equal quantities of methylene chloride and an aqueous solution containing 31% of acetic acid are mixed together, allowed to separate and the extract distilled, a clean separation occurs. During distillation the temperature rises rapidly between 60° C. and 100° C., indicating the practically complete removal of the methylene chloride at 60° C. The acetic acid remaining in the still is of high concentration varying from 92% to 98.6% or more.

In order to further illustrate this invention the following detailed example is given, it being understood that the same is not limited to the specific details or proportions.

*Example.*

A long extraction column is fitted in its upper end with an inlet for the methylene chloride extracting fluid, the inlet consisting of a jet drilled with a large number of fine holes. Further the top of the column is provided with a valve control run off for the extracted aqueous acid. Towards the lower end of the extraction column is the inlet pipe for the aqueous acetic acid to be extracted, the inlet being controlled by a ball valve in accordance with the rate of drawing off the extracted aqueous acid at the top. The lower part acts as a separating chamber for the mixed liquids and is provided with a sight glass and a constant level overflow. The extract consisting of acetic acid and the methylene chloride is drawn off from the lower part of the extraction column and passes to any usual type of continuous fractionation apparatus. The strong acetic acid is run off from the base of this apparatus and the methylene chloride vapors from the top thereof is preferably condensed at a sufficient height to be refed to the top of the extraction column by gravity. The extraction is carried out at ordinary temperature. Initially the extraction column is filled with aqueous acetic acid of about 31% strength. The supply of the methylene chloride liquid from a storage vessel is next turned on and when samples of the extracted aqueous acid drawn off from the top of the column shows this acid to be so weak as to be valueless, continuous running off is begun. The aqueous extracted acid obtainable by this process contains a very small amount of acetic acid. The extracted aqueous acid run off may be heated to recover any methylene chloride before running to waste. The strong acetic acid taken from the continuous fractionation apparatus has a concentration of 92 to 98.4%. The methlyene chloride from the fractionation apparatus which, as explained above is returned to the process, is found to contain 0.36% or less of acetic acid.

Though the process of the invention has been described above chiefly with reference to the concentration of dilute acetic acid, it may be applied to concentrating solutions of other lower aliphatic acids such as propionic acid.

It is to be understood that the foregoing detailed description is given merely by way of illustration and that many variations may be made therein without departing from the spirit of this invention.

Having described my invention what I claim and desire to secure by Letters Patent is:

1. Process of concentrating aqueous solution of lower aliphatic acid comprising extracting the aqueous solution with an extracting medium containing a methylene halide.

2. Process of a concentrating aqueous solution of acetic acid comprising extracting the aqueous solution with an extracting medium containing a methylene halide.

3. Process of concentrating aqueous solution of lower aliphatic acids comprising extracting the aqueous solutions with an extracting medium containing methylene chloride.

4. Process of concentrating aqueous solutions of acetic acid comprising extracting the aqueous solutions with an extracting medium containing methylene chloride.

5. Process of concentrating aqueous solutions of aliphatic acid comprising extracting the aqueous solution with an extracting medium containing a methylene halide by passing the aqueous solution and the extracting medium in counter-current through a column.

6. Process of concentrating aqueous solutions of acetic acid comprising extracting the aqueous solution with an extracting medium containing a methylene halide by passing the aqueous solution and the extracting medium in counter current through a column.

7. Process of concentrating aqueous solutions of lower aliphatic acids comprising extracting the aqueous solutions with an extracting medium containing methylene chloride by passing the aqueous solution and the extracting medium in counter current through a column.

8. Process of concentrating aqueous solutions of acetic acid comprising extracting the aqueous solutions with an extracting medium containing methylene chloride by passing the aqueous solution and the extracting medium in counter current through a column.

9. Process of concentrating aqueous solutions of acetic acid comprising extracting the aqueous solution with an extracting medium containing a methylene halide by passing the aqueous solution and the extracting medium in counter current through a column, separating the extracting medium containing the acid and distilling the same to separate the acid from the extracting medium.

10. Process of concentrating aqueous solutions of acetic acid comprising extracting the aqueous solutions with an extracting medium containing methylene chloride by passing the aqueous solution and the extracting medium in counter current through a column, separating the extracting medium containing the acid and distilling the same to separate the acid from the extracting medium.

11. Process of concentrating aqueous solutions of acetic acid comprising extracting the aqueous solutions with an extracting medium containing methylene chloride by passing the aqueous solution and the extracting medium in counter current through a column, separating the extracting medium containing the acid, distilling the same to separate the acid from the extracting medium, and returning the extracting medium to the process.

12. Process of concentrating aqueous solutions of lower aliphatic acids comprising extracting the same with an extracting medium containing methylene chloride and ether.

13. Process of concentrating aqueous solutions of acetic acid comprising extracting the same with an extracting medium containing methylene chloride and ether.

14. Process of concentrating aqueous solutions of lower aliphatic acids comprising extracting the same with an extracting medium containing at least substantially 80% of methylene chloride and ether not exceeding substantially 20%.

15. Process of concentrating aqueous solutions of acetic acid comprising extracting the same with an extracting medium containing at least substantially 80% of methylene chloride and ether not exceeding substantially 20%.

In testimony whereof, I have hereunto subscribed my name.

HERBERT E. MARTIN.